United States Patent Office 2,712,999
Patented July 12, 1955

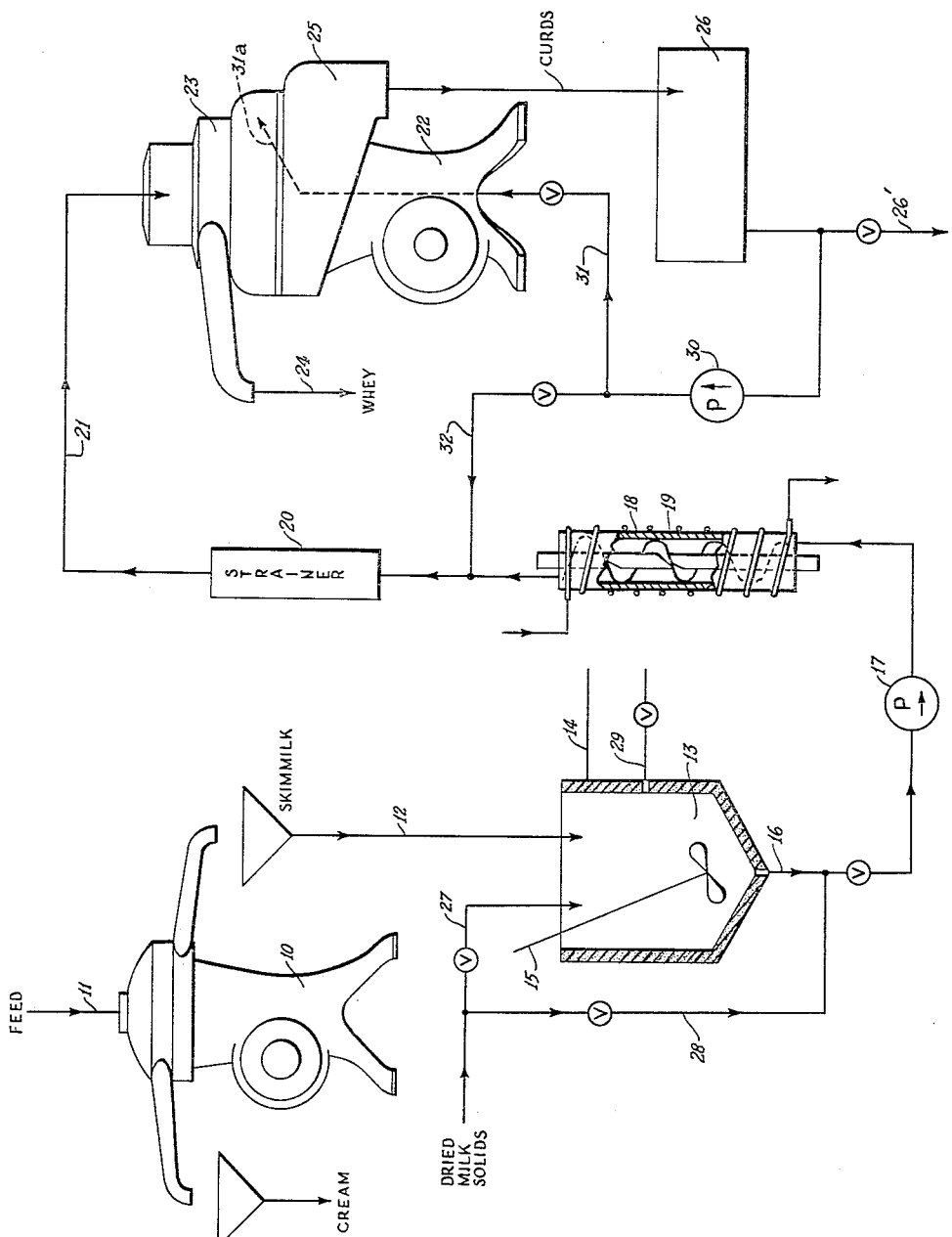

2,712,999

PROCESS FOR MAKING CHEESE

George J. Strezynski, Poughkeepsie, N. Y., assignor, by mesne assignments, to Faster Food Products Company, New York, N. Y., a partnership Application September 18, 1951, Serial No. 247,125

10 Claims. (Cl. 99—116)

This invention relates to the production of cheese from skim milk or milk of low fat content, and has for its principal object the provision of an improved process for such production in which base curds of smooth texture, having a sufficiently low moisture content for direct consumption, are obtained by a continuous and rapid extraction of whey from the curds.

Milk of low fat content (that is, having up to 2% of butter fat) is used for the production of several types of cheese. One of the most popular of these so-called skim milk cheeses is bakers' cheese, which is used not only for direct consumption, sometimes enriched with cream as an additive, but also in large quantities for making cheese cakes and other products. However, bakers' cheese and other types of skim milk cheese, as made heretofore, have required a lengthy processing procedure utilizing bags for draining the whey from the curds, or tanks for draining, cutting, etc.

According to conventional and long-used practices in the manufacture of skim milk cheeses, the skim milk is treated with additives to make a coagulable "mix," which is set at a low temperature for a period of about 18–30 hours. At the end of the setting period, the whey has been effectively separated from the relatively heavier precipitated curds, and is drained from the setting tank. The remaining curds are then placed in bags and pressed over a period of about 24–48 hours at the setting temperature or in a cooler, at the end of which time the curds should be in the form of a heavy paste having a total milk solids concentration on a dry basis (by weight) in the order of 18%–26%. The main objections to this conventional procedure are the prolonged time required for the pressing of the curds, and the labor and material expense involved in the bagging or draining. The long draining or pressing period is also objectionable in that it entails a substantial inventory "in process" and requires a substantial plant storage area for the curds while they are being processed.

The present conventional method of preparing the cheese "mix" is a gradual development of years of practice with the object of controlling the final acidity of the cheese and enabling the whey to drain from the bags so as to produce a cheese having approximately 25% total solids. The procedure must also assure that the cheese will not be too granular and will have a pleasant flavor. Accordingly, the treatment must be carefully controlled. Such control is effected by means of the additives to the skim milk in the "mix," which allow a long period of setting and cause a very gradual change in the material, so that it can stand in bags for a day or two without adversely affecting the product. Among these additives are the so-called "starters," which are curdled milk precipitated by means of strictly controlled bacteria. Another additive is rennet, which is an extract from calves' stomachs. A third additive, occasionally used, is calcium chloride. The additives contribute to precipitating the milk in the desired length of time, eliminating erratic behavior of the set, protecting against self-inoculation of the milk from impurities in the dairy, imparting the desired formation to the cheese particles, etc.

The setting of the mix is usually effected at a low temperature in order to prolong the time of setting and thereby prevent a granular consistency of the cheese. Heating of the mix accelerates the precipitation but causes granulation. For example, when the cheese mix is set at 110° F. it generally coagulates within a few hours but forms such a hard curd in the setting tank that the cheese lumps require the use of an instrument to cut them.

The period of setting is also affected by calcium chloride, the absence of which prolongs the setting period. The calcium chloride additive also replaces the natural calcium chloride in the milk, which is either precipitated or made less active by the heat of pasturization, and it aids in digestion of the milk and formation of the curd. The function of the starter is to accelerate the formation of lactic acid by the bacterial action. A good grade starter should have an acidity of not over .8 and should be free of gas. It is added to the skim milk in varying proportions, depending upon the type of cheese to be made. (For bakers' cheese it usually varies from 2 to 5%.) The rennet furnishes pepsins and enzymes of controlled quantity to replace those present in raw skim milk but which are destroyed by pasteurization. In some cases, no rennet is added to the milk and the action is obtained from the started and additional heat. The best example of this is the so-called "pot-cheese." Rennet is a very powerful reagent. As little as one part of rennet in 8000 parts of skim milk will cause coagulation. The normal practice in making bakers' cheese is to add between 1 cc. of rennet per 80 lbs. of milk and 1 cc. per 1000 lbs. of milk. Generally, when less rennet is used it is necessary to use more starter. If less rennet is used in making the set, a higher heat may be used before the separation without causing excessive granulation.

Attempts have been made heretofore to use a centrifugal separator in the production of skim milk cheeses, in place of the pressing or bagging operation. However, the cheeses resulting from these attempts have been far from satisfactory, because the curds discharged from the centrifuge have been either too thin and watery or too granular, or both; and only a small part of the separating capacity of the centrifuge could be used due to the difficulty in discharging the curds. For example, when curds prepared in a conventional manner for bagging were centrifuged in a standard De Laval "AC–VO" separator, the capacity of the separator was less than one-third of its rated capacity and the cheese discharge through the peripheral nozzles of the centrifugal bowl had only 13–15% of total solids (by weight), whereas a minimum of 18% is generally required by legal restrictions covering the sale of such products. This condition persisted even when the feeding of the curds to the centrifuge was very carefully controlled. At the low capacity of the centrifuge, it was impossible to reduce the discharge rate of the cheese sufficiently to provide a cheese having in excess of 15% total solids, because the bowl nozzle holes for the discharge of the cheese must be large enough to prevent the cheese from plugging these holes. When the bowl was equipped with nozzles having the smallest practicable holes consistent with uninterrupted discharge of the cheese, more than two-thirds of the feed to the centrifuge was discharged through the nozzles and only one-third through the effluent spout. Consequently, the cheese had to be very thin. Even when part of the discharged cheese was recirculated to the bowl nozzles, so as to increase the rate at which the solids enter the bowl without increasing the actual feed rate to the bowl, the cheese had only 16–18% total solids.

I have discovered that by setting the cheese mix at a temperature within a certain range and then heat-treating the curds within a certain higher temperature range before they are centrifuged, the cheese can be discharged continuously from the centrifuge with a solids content of 20% or more and with no objectionable graininess. More particularly, according to one feature of the invention, the mix is prepared in the conventional manner from milk of low fat content (hereinafter referred to as skim milk) and held at a temperature of 70°–78° F. in the setting tank in mixture with the starter to coagulate and precipitate the curds, after which the curds are heated to a temperature of 80°–100° F., preferably about 90° F. The heat-treated curds are then fed promptly to the centrifuge, where a substantial portion of the remaining whey is quickly and continuously separated from the curds, the latter being discharged with the desired dryness. The curds are discharged at high speed through the peripheral wall of the centrifuge bowl, by the centrifugal force thereon, so that they are impacted against the stationary collecting cover for the curds, whereby the curds are subjected to a strong working action. The final temperature to which the curds are heated prior to the centrifuging is extremely important. As the final temperature decreased below 90° F., the cheese discharged from the centrifuge becomes less dry, and if the final temperature is less than about 80° F. there is no appreciable effect of the heating with respect to improving the dryness of the discharged cheese. As the final temperature increases beyond 90° F., the texture of the discharged cheese is adversely affected, and if the final temperature exceeds about 100° F. the cheese acquires an objectionable granular or sandy consistency.

In the preferred practice of the invention, if the cheese mix is prepared according to conventional procedure for making skim milk cheeses, the heat-treated cheese discharged from the centrifuge is then subjected to grinding operation, as by means of a colloid mill or a mechanical homogenizer, to remove the graininess of the cheese. In this way, over-sized granular particles are broken up and distributed throughout the cheese, so that it has an apparently smooth texture. The cheese can then be packaged and placed in a cooler, or it can be used as a base curd for making cheese products.

For a better understanding of the invention reference may be had to the accompanying drawing which schematically illustrates a system particularly adapted for the practice of the process in its preferred form.

In the drawing, the numeral 10 designates a centrifugal separator to which whole milk is fed by means of a pipe 11. In the centrifuge 10 the milk is separated into its cream and skim milk constituents, the centrifuge being preferably adjusted to provide a skim milk having no more than 0.1% of butter fat. The skim milk is passed through a pipe 12 to a setting tank or zone 13, which is jacketed and has a pipe line 14 for introducing a heat transfer liquid into the jacket space. After a body of skim milk has been collected in tank 13, the skim milk is inoculated with a "starter" or curdling agent and rennet is added. The mix is held in the tank for a period sufficient to coagulate and precipitate the curds, thereby forming an acid mixture of precipitated curds as a heavier constituent and whey as a lighter constituent. This period may be 12–28 hours, depending upon the particular characteristics of the "starter" used and the amounts of rennet and calcium chloride, if any, which are added. The temperature to be used for the cheese set is 70°–78° F., and the mixture in tank 13 may be heated to and held at this temperature range by means of the heat transfer agent introduced into the tank jacket via pipe 14.

At the conclusion of the setting period, the curds have been coagulated and have a specific gravity in excess of that of the whey. Thereafter, the body of the set is subjected to a short period of agitation, as by means of a stirrer 15, or the agitation may be performed manually by cutting the body of the set into small lumps. In any event, care should be taken to assure that the agitation is of a mild order; otherwise, the curds may become aerated. The purpose of the agitation is to obtain a uniform mixture of precipitated curds and whey within the tank.

The curds are withdrawn from the lower part of tank 13 via pipe 16 and forced by a pump 17 to a heating device 18 having a rotating continuous (helical) scraper 19. This screw type scraper serves as a conveyor within the heater unit and forces the curds to and through a strainer 20 to the centrifuge 22, via pipe 21. The conveyor or scraper 19 also serve to remove any material adhering to the walls of the heater and thus prevent the curds or other solids from being baked upon the surfaces of the heater. During the flow of the mixture through the heater, the temperature of the mixture is raised from that at which the mix was set (70°–78° F.) to a temperature between 80° and 100° F., and preferably within the range of 85°–95° F. Optimum results have been obtained when the separation of the mix was performed at 90° F.

Promptly after the mix has been heated to approximately 90° F., it is forced through the strainer 20 to the centrifuge 22, which is preferably of the type in which the centrifugal bowl has peripheral outlets in the form of discharge nozzles for the separated heavy constituent (curds) and a central outlet for the separated lighter constituent (whey). A centrifugal bowl of this type is disclosed in my U. S. Patent No. 2,500,101 granted March 7, 1950. The centrifuge 22 may be of the standard De Laval "AC-VO" type. The mixture is separated within the bowl of centrifuge 22 into an inner annulus of whey and an outer annulus of cheese curds. The whey is discharged continuously through the central outlet of the bowl into a cover 23 and passes through a spout attached thereto to the whey discharge line 24. The separated curds in the outer annulus are discharged through nozzles, arranged about the periphery of the bowl, into a cover 25 and are conducted therefrom to a receptacle 26 from which they may be withdrawn for final packaging via pipe 26'. By reason of the large centrifugal force in the separator bowl, the curds are discharged through the outer periphery of the bowl or centrifugal locus in one or more streams at high speed. In this way, the curds are caused to impinge at high velocity against the inner wall of the usual stationary cover for receiving the heavier discharge, which results in a desirable working action on the curds so that they can be used without further processing.

I have found that the quality and texture of the cheese product may be enhanced if, in addition to the aforementioned heat treatment of the mix just prior to its centrifugal separation at 22, the pH value of the mix is about 4.5 and the acidity (expressed in percent of lactic acid) is about .8–.9, when the mix is fed to the centrifuge 22. The acidity and pH value may be regulated by means of the additives mixed with the skim milk in the setting tank 13. Dried milk solids may be added to the mix to increase the total solids content thereof, either before the mix is set in the setting tank 13 (via conveyor 27) or at the conclusion of the setting period (by adding the solids via conveyor 28 to the material being fed to the heater 18). The total solids content of the mix fed to the centrifuge 22 may be enhanced also by drawing off 50% or less of the whey separated in the setting tank 13 during the setting period. A draw-off line 29 suitable for this purpose is indicated in the drawing.

The total solids content of the final cheese product discharged from outlet 25 of centrifuge 23 may be enhanced by a recirculation arrangement comprising a pump 30 and pipe 31 connected to flush tubes 31a within the centrifugal bowl, whereby a portion of the curds discharged from the centrifuge to receptacle 26 are returned to the peripheral portion of the solids annulus within the bowl. An arrangement of flush tubes within a centrifugal bowl adapted for the above described recirculation is disclosed in my aforementioned Patent No. 2,500,101. Since these curds to be recirculated by pump 30 will be at a temperature somewhat above that at which they were fed to the centrifuge, due to internal friction within the bowl and the discharge covers, it may be advantageous to provide an alternative recirculation stream by which the curds are returned directly to the feed pipe 21 for the centrifuge, at a point in advance of heater 18, via pipe 32. In this way, the temperature of the feed stream passing to the heater may be somewhat elevated, thus reducing the load on the heating coil for the heater.

As previously mentioned, the curds discharged from the centrifuge 22 may be subjected to a grinding operation, as by means of a colloid mill or a mechanical homogenizer, to reduce the grains in the curds. In case the curds discharged from the centrifuge are not as dry as desired, dried milk solids may be added to and mixed with them to reduce the percentage of moisture. The mixing of the curds and dried milk solids may be effected by means of an homogenizer and, if desired, in the same operation as the grinding.

I have found that cheese curds produced according to the present invention are heat-stable. That is, they can be heated to pasteurizing temperature (145° F. or higher) without acquiring a grainy, tough or soupy consistency. Furthermore, this characteristic of the curd is not dependent upon the use of any special additive in the nature of a water binder. While it has been possible heretofore to produce heat-stable cheese curds having a substantial fat content (the butter-fat evidently accounts for the heat-stability), I am the first, so far as I am aware, to have produced a skim milk cheese having this characteristic. I attribute this result, in a large measure, to the previously-described heat-treatment of the curds, which enables them to be centrifugally separated to the desired dryness and consistency and to the centrifugal action under these conditions, which causes the curds to be discharged with the particles finely divided and each surrounded by moisture.

I claim:

1. In the production of skim milk cheese, the process which comprises accumulating a body of milk having less than 2% of fat in a setting zone, holding the thin milk in said zone at a temperature of 70°–78° F. in the presence of a starter, coagulating the curds in said zone to form therein an acid mixture of precipitated curds as a heavier constituent and whey as a lighter constituent, heating the curds while fluid to a temperature of 80°–100° F., feeding the curds at a temperature of 80°–100° F. to a locus of centrifugal force and there separating them into an inner annulus of whey and an outer annulus of curds, continuously discharging the whey from said locus from the inner annulus therein, discharging curds from said outer annulus through the outer wall of the locus at high speed, and impacting the discharging curds by suddenly changing their velocity.

2. A process according to claim 1, in which the curds are heated to a temperature of about 90° F. and are fed at about 90° F. to said locus.

3. A process according to claim 1, in which the curds are withdrawn from the bottom of the holding zone and fed in a continuous stream to said locus by way of a heating zone wherein said heating is effected.

4. A process according to claim 1, in which the mixture of curds and whey is subjected to mild agitation prior to said heating.

5. A process according to claim 1, comprising also the step of grinding the curds discharged from said locus, to reduce the grains in the curds.

6. A process according to claim 1, in which the curds are fed to said locus at a pH of about 4.5 and an acidity of about .8–.9, expressed in percent of lactic acid.

7. A process according to claim 1, comprising also the step of adding dried milk solids to the material in process at a point in advance of said heating.

8. A process according to claim 1, comprising also the step of recirculating to said locus, during the separating operation therein, a portion of the curds discharged from the locus.

9. A process according to claim 1, comprising also the step of mixing with the curds, after said heating thereof, a portion of the curds previously discharged from the locus.

10. A process according to claim 1, comprising also the step of adding dried milk solids to the curds discharged from said locus, and homogenizing the curds to mix said solids therein and reduce the grains in the curds.

References Cited in the file of this patent

UNITED STATES PATENTS

| | | |
|---|---|---|
| 2,387,276 | Link | Oct. 23, 1945 |
| 2,415,239 | Flowers et al. | Feb. 4, 1947 |
| 2,574,508 | Strezynski | Nov. 13, 1951 |